United States Patent Office 3,527,750
Patented Sept. 8, 1970

---

3,527,750
ISOLATION OF SUBSTANTIALLY
PURE COUMERMYCIN $A_1$
Andrew E. Karr, Bloomfield, N.J., assignor to Hoffmann-La Roche Inc., Nutley, N.J., a corporation of New Jersey
No Drawing. Continuation-in-part of application Ser. No. 702,806, Feb. 5, 1968. This application Jan. 23, 1969, Ser. No. 793,536
Int. Cl. C07c *47/18*
U.S. Cl. 260—210                                                   12 Claims

ABSTRACT OF THE DISCLOSURE

Coumermycin $A_1$ is isolated from the crude antibiotic complex by a fractional liquid extraction procedure utilizing an isopropanol-chloroform mixture and an aqueous alkaline buffer solution as the solvents.

RELATED APPLICATIONS

This application is a continuation-in-part of application Ser. No. 702,806, filed Feb. 5, 1968, now abandoned. The benefit of the date of this application is hereby claimed.

BACKGROUND OF THE INVENTION

The antibiotic coumermycin (previously called sugordomycin) is produced by culturing *Streptomyces hazeliensis* var. *hazeliensis* nov. sp., an organism isolated from a sample of soil obtained in Matane, Gaspe, Canada. A culture of the organism has been deposited in the collection of microorganisms of the United States Department of Agriculture, Northern Utilization Research and Development division, Peoria, Ill. under Registration No. NRRL 2938.

The processes for producing the antibiotic, as described in detail in Belgian Pat. No. 665,237, Dec. 10, 1965, result in a crude complex of antibiotic compounds. At least five active components and an inactive fraction can be isolated from this complex. Of the active components, that denoted "coumermycin $A_1$" is the most active. This is the fully methyl pyrrolated compound of the formula

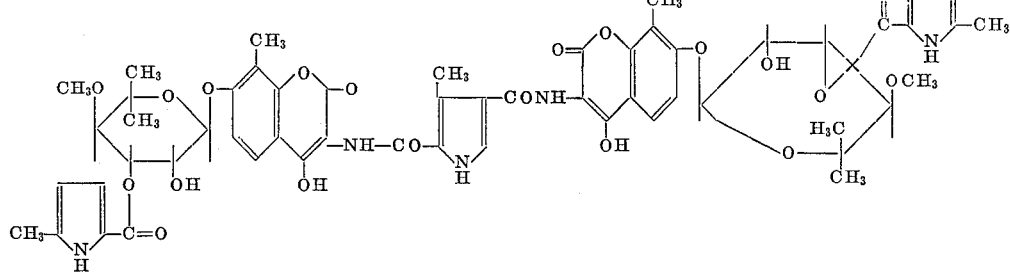

Various methods which have been used, prior to this invention attempting to separate coumermycin $A_1$ from the crude complex have resulted in a product of no better than 75% purity.

BRIEF SUMMARY OF THE INVENTION

This invention is directed to a process in which coumermycin $A_1$ is separated in pure form, up to 98% or more purity, from a crude complex of antibiotic compounds, utilizing a fractional liquid extraction process. The solvent system used consists of the two mutually saturated phases formed by equilibrating a mixture of equal volumes of chloroform and isopropanol with an equal volume of M/15 $Na_2HPO_4$ buffer solution adjusted to about pH 8.2 with phosphoric acid.

DETAILED DESCRIPTION OF THE INVENTION

A crude antibiotic complex can be produced by culturing *Streptomyces hazeliensis* var. *hazeliensis* nov. sp. in a nutrient medium containing organic carbon and nitrogen sources, preferably split peas (which is both a carbon and a nitrogen source) and from about 0.05% to about 3% $CaCO_3$, from about 0.1% to about 3% of a carbohydrate, e.g., a starch or sugar and from about 0.1% to about 0.5% $K_2HPO_4$. The sulturing is carried out from about 3 to about 8 days at an aeration rate of from about 0.5 to about 10 c.f.m. per 50 gallons of medium, at a temperature of from about 20° C. to about 35° C. The resulting crude antibiotic complex is then isolated from the fermentation broth.

This isolation can be accomplished by any one of several methods. For example, one technique is to acidify the broth with a mineral acid, e.g., phosphoric acid, to a pH of about 2 to 7, filter the acidified broth, suspend the resulting filter cake in an organic solvent, e.g., a lower alkanol, filter or centrifuge the resulting slurry, neutralize the resulting filtrate or extract with alkali to a pH of about 6 to 7, remove the solvent to form a concentrate, precipitate the crude antibiotic complex with a non-polar solvent, and recover the precipitate. Another technique involves filtering off the cells containing the complex from the fermentation broth, acidifying the filtrate with a mineral acid to a pH of from about 1 to 7, contacting the acidified filtrate with a water-immiscible solvent, separating the aqueous layer, removing the water-immiscible solvent to leave the crude antibiotic complex, or alternatively, the water-immiscible solvent solution can be passed through an adsorbent, e.g., an ion exchange resin or activated charcoal, to absorb the crude antibiotic complex which can then be removed from the adsorbent by elution with a solvent such as methanol. The cells originally filtered off can then be extracted with an organic solvent, e.g., a lower alkanol, and the solvent removed leaving behind a crude antibiotic complex which can then be combined with the complex obtained from the filtrate above.

The crude antibiotic complexes thus obtained can be purified by several methods. For example, in one method the complex is suspended in acetone and treated with sufficient mineral acid to obtain a pH of from about 2 to 6. The resulting insoluble material is then filtered off and the filter cake washed with acetone. The combined filtrate and wash can then be evaporated under vacuum to form a concentrate. The concentrate is then added to water and benzene giving a suspension of solids in the two liquid phases. The suspension, which is the acidic complex, is then filtered off and the precipitate suspended in warm methanol which, after cooling, is filtered leaving a solid which is the acidic complex.

In another method for purifying the complex, the benzylamine salt of the complex is prepared by dissolving the complex in an organic solvent such as n-butanol and treating with an excess of benzylamine whereupon the benzylamine salt of the complex precipitates. This precipitated salt is filtered off and the acidic complex is obtained by treatment with an aqueous mineral acid, followed by extraction of the acidic complex from the aqueous system by the use of an organic solvent immiscible or slightly miscible with water. The immiscible solvent is then removed and the residue is precipitated, e.g., from a hot methanol-benzene mixture.

The crude complex can also be purified by distributing it between an organic solvent and an aqueous buffer solution buffered to a pH of about 6.8 to 11. The complex in the aqueous buffer solution can be isolated by acidification e.g. with a mineral acid, to a pH about 2 to 5. The resulting suspension can then be extracted with an organic solvent which is immiscible or slightly miscible with water, and the complex is recovered from the organic solvent, e.g. by evaporation of the solvent.

The process of this invention relates to the separation and isolation of coumermycin $A_1$ from the complex resulting from these isolation and purification techniques. In the usual case, no more than about 50 percent by weight of coumermycin $A_1$ is present in and available for separation from the complex.

Briefly, the process of this invention involves introducing an organic solvent phase at the top of a fractional liquid-liquid extraction column, a buffered aqueous phase at the bottom of the same column and the complex, dissolved in a suitable solvent, at the middle of the column. The organic solvent phase is heavier than the aqueous phase and travels downwardly in the column, dissolving coumermycin $A_1$ from the complex. The aqueous solvent phase ascends the column and dissolves the remaining portions of the complex. Thus, the heavy organic solvent phase extracts the desired coumermycin $A_1$ component, which is withdrawn from the bottom of the column and separated as about 98 percent pure coumermycin $A_1$.

The choice of extraction column may be made among the many available in the prior art. Representative of appropriate multistage extraction columns suitable for the purpose of invention is a multi-stage solvent extraction column which is commonly called the Scheibel extraction column and is shown in U.S. Pat. No. 2,850,362 or a reciprocating-plate multi-stage extraction column, such as is described in A.I.Ch.E. Journal, Vol. 5, No. 4, pp. 446-452, December 1959. The latter is preferred for the purposes of the present invention.

In practice, the column utilized is the usual one necessary for the exchange of material in liquid-liquid contact apparatus. They are vertical columns in which energy for the intensive exchange of material between two phases is applied with the aid of mechanical means. The energy can be provided by rotating stirrers. Examples of this kind of apparatus is the above-noted Schiebel extractor and other designs. Also capable of providing the energy for intensive mixing between the two phases is the reciprocating-plates of the reciprocating-plate extraction column referred to above. In the reciprocating-plate multi-stage extraction column, a series of plates are provided in series. The reciprocating plates are mounted on a central shaft which is reciprocated by a simple drive mechanism on the top of the column. The variable drive speed makes it possible to operate over a range of speeds of from about 100 to 3,000 strokes per minute. For particularly advantageous results, in the extraction procedure described herein, a reciprocating plate extraction column is utilized and the variable drive is operated over a range of speeds of from about 150 to about 300 strokes per minute. In a reciprocating-plate extraction column, after intensive mixing in the immediate vicinity of the reciprocating plates, the particles of similar composition can combine (agglomerate) and flow together on the way to the next reciprocating plate.

From the foregoing, it can be seen that the extraction column usable for the purposes of the present invention have different inlet and outlet pipes for the inflow and discharge of liquids. The inlet near the base of the column admits the lighter liquid (the aqueous buffered phase) and the part at the top of the column discharges the lighter liquid. Conversely, the heavier liquid (the organic solvent phase) is admitted near the top of the column and flows out from an opening at the bottom of the column. In operation, the whole of the heavy phase in the vicinity of a reciprocating plate flows downwardly toward the next consecutive reciprocating plate under the influence of the reciprocating plate which it is in the vicinity of and its greater density. The light phase flows upwardly from each reciprocating plate under the influence of the reciprocating plate and its lighter density. The reciprocating plates break the dispersed phase droplets into droplets having significantly smaller dimensions. The smaller droplets tend to agglomerate and are again broken up by next plate. This mechanical operation occurs throughout the entire column. As the heavier phase descends the column, coumermycin $A_1$ is dissolved therein from the complex. Ultimately, the heavy phase with the dissolved coumermycin $A_1$ therein reaches the opening at the bottom of the column and is drawn therefrom.

The present invention distinguishes over prior art procedures for effecting the separation of the crude complex coumermycin in that it effects the separation of the most active principle of the crude; namely, coumermycin $A_1$ is high yields and in good purity. In prior art procedures for effecting this end, resort had to be made to complex Craig counter-current procedures which require a multiplicity of tubes. As much as 200 and considerably more counter-current tubes have been required previously to be placed in the extraction system to effect a separation of $A_1$ from the crude complex coumermycin.

The advantage in providing an extraction technique particularly from a commercial point of view which avoids a myriad of tubes should be readily apparent. It is this finding that a single extraction column utilizing a solvent extraction system will result in the extraction of coumermycin $A_1$ from the crude complex coumermycin that is at the heart of the present invention.

The organic solvent phase, to be effective in the fractional liquid extraction process of this invention must be a good solvent for the desired antibiotic component. Additionally, the organic solvent phase must extract the desired coumercycin $A_1$ only, i.e. the distribution coefficient of the coumermycin $A_1$ must be relatively favorable in the direction of the organic solvent phase at the conditions under which the extraction takes place.

A typical extraction solvent system which fulfills the above requirements is prepared by mutually saturating at the temperature at which the extraction process is to be run, an aqueous buffered solution, preferably, a solution containing appropriate amounts of $Na_2HPO_4$, having a pH of about 8.0 to about 8.8, preferably 8.2, and an equal volume of 1 to 1, by volume, mixture of a halogenated hydrocarbon, preferably, chloroform and a $C_3$-$C_9$ alkanol, preferably, isopropanol, and separating the two resulting phases.

Temperature of the extraction process described herein can be varied between wide limits. However, the key to obtaining the desired separation of the crude components in good yields resides in the fact that if other factors be varied, e.g. pH or solvent ratio, a corresponding adjustment in temperature from the preferred range must be effected in order to insure good results. Under preferred conditions, temperature from 20° C. to about 30° C. are suitable for this purpose. However, inasmuch as the distribution coefficient in the solvent phases of the various components of the coumermycin crude complex vary markedly with temperature, it is important to control the temperature of the extraction procedure so that it is constant throughout the entire length of the column. To illustrate this, in a preferred aspect, the temperature of the extraction procedure should be maintained at 25°

C., that is to say, the temperature throughout the entire length of the extraction column should be maintained constant at 25° C.

As is evident from the above, the present invention is not intended to be limited to this preferred range and it is well within the skill of the artisan to vary temperature to achieve good yields provided corresponding adjustments in the other factors which influence the yields, e.g. pH and solvent ratio are correspondingly varied.

As is evident from the above, the solvent extraction system comprises a heavier phase and a light phase. The heavier phase is an organic phase, and contains preferably by weight 74.5 percent of chloroform, 23.25 percent of isopropanol and 2.25 percent by weight of water. The lighter phase is the aqueous phase and has a pH of about 8.0 to about 8.8 and contains by weight 1.5 percent of chloroform, 15 percent of isopropanol and 83.5 percent of water. The aqueous phase serves as the buffered aqueous phase. It is of course to be understood that other organic substances can be utilized to form respective phases. Representative of other organic substances utilizable accordingly are alkanols containing 4–9 carbon atoms such as N-octanol, N-butanol, N-pentanol and the like. Esters such as lower alkyl acetates, e.g. N-butyl acetate, ethyl acetate and the like and ethers such as diethyl ether, methylethyl ether and the like can also be efficaciously employed.

As should appear from the above, the distribution coefficients, e.g. the concentration of extracted materials in the organic phase divided by the concentration of extracted materials in the aqueous phase vary markedly with respect to both temperature and concentration. However, the distribution coefficient of coumermycin $A_1$ relative to that of coumermycin $A_2$, the second most prevalent portion of the complex, is fairly constant and is approximately 2.5. Since the concentration of the compounds varies throughout the length of the extraction column, the distribution coefficients of the key components, coumermycin $A_1$ and coumermycin $A_2$ also vary throughout the length of the extraction. Consequently, the proper solvent ratio to use for the optimum separation of coumermycin $A_1$, from all the other constituents in the complex has to be determined in an empirical manner. Of course, theoretical calculations including the use of a computer can be used to estimate the proper solvent ratio under given temperature and concentration conditions, but eventually conventional tests must be run to select the solvent ratio for optimum separation, purification and recovery of coumermycin $A_1$ under the proscribed conditions.

The distribution coefficient which is also a function of pH, varies markedly with pH changes. pH's ranging from about 8.0 to about 8.5 are considered to be optimum for the process of this invention. At pH's below 7, selectivity falls off sharply and at high pH's, e.g., over 8.8, the compounds tend to become chemically unstable. Thus, the fractional liquid extraction process is preferably carried out according to this invention at a pH range of about 8.0 to about 8.5 in the aqueous phase in the various portions of the extraction column.

It should be pointed out that it is possible to use other concentrations of buffer solution and other solvent systems which would result in different effects of concentration and temperature on the distribution coefficients. The optimum solvent ratios to employ would consequently vary from that employed with the specific solvent system selected to illustrate the inventive process.

For convenience, the process wherein the temperature is maintained at 25° C. is described. However, it must be understood that cooler or warmer temperatures can be used with equal effectiveness, provided the remaining conditions are accordingly modified.

According to the process of this invention, the inactive component is separated from the active fraction prior to isolation of coumermycin $A_1$. This can be accomplished either by fractional liquid extraction or by crystallization as described herein.

The following examples illustrate the process of this invention. It is intended that these examples are illustrative only and in no way limitative of the scope of the invention. Temperatures are in °C.

EXAMPLE 1

1 kg. of a crude antibiotic mixture produced according to the known fermentation processes whereby the organism NRRL 2938 is cultured and the product isolated, is dissolved in about 170 liters of a solvent having a composition of 23.25% isopropanol, 74.5% chloroform, and 2.25% water, by weight. The solution is filtered and then concentrated to 50 liters. During the concentration, essentially all the chloroform is distilled off and isopropanol is fed into the still as required to maintain the 50 liter volume. The temperature of the batch is kept at about 25° by gradually decreasing the pressure.

The batch is filtered and washed with isopropanol. The mother liquor is set aside and 750 grams (dry basis) of alcohol-wet solids are redissolved as a 3–4 weight/volume percent solution in the same chloroform, isopropanol, water solvent used in the previous crystallization.

This 3–4 percent solution is used as a feed to the fractional liquid extraction column. The column employed is a reciprocating plate extraction column 3" in diameter and 23 feet high. This feed is pumped into the center of the column at a rate of 40 grams per hour (dry basis). The organic phase solvent system having a composition of 23.25% isopropanol, 74.5% chloroform, and 2.25% water is fed into the top of the column at a rate of 120 to 133 cc./minute. The buffered aqueous phase solvent having a pH of 8.5–8.6 and a composition of 1.5% chloroform, 15% isopropanol, and 83.5% dilute phosphate buffer is fed into the bottom of the extraction column at a rate of 400 cc./minute. The aqueous solvent extracts all the undesired compounds along with a small amount of coumermycin $A_1$ from the feed while ascending the column and overflows into an agitated receiver. There it is continuously neutralized to a pH of 6.2–6.4 with a stream of 10% phosphoric acid to prevent isomerization of the solute.

The organic solvent descends the column, extracts coumermycin $A_1$ and flows into an agitated receiver containing some aqueous solvent previously adjusted to a pH of 5.5–5.7. This aqueous buffer continuously neutralizes the organic underflow stream to minimize isomerization of the product.

The product is recovered from the organic solvent streams as follows:

The pH of the buffer layer is adjusted to 5.5–5.9. The organic layer is separated, washed with an aqueous solution having a composition essentially identical to the aqueous solution used in the extraction column without the $Na_2HPO_4$. The organic layer is then concentrated to 10 liters. The resulting slurry is filtered and washed with isopropanol. The resulting product, coumermycin $A_1$, is dried in a vacuum oven at 35–40° and is 97% pure.

EXAMPLE 2

The procedures of Example 1 are followed except that tetrahydrofuran is used to dissolve the antibiotic mixture fed into the center of the column, in place of the mixed chloroform-isopropanol solvent. The product recovered is 97% pure coumermycin $A_1$.

What is claimed is:
1. A method of isolating substantially pure coumermycin $A_1$ from a complex removed from the fermentation broth which comprises separating said coumermycin $A_1$ by fractional liquid extraction means utilizing as the solvent system an organic solvent selected from the group consisting of halogenated hydrocarbons, alkanols containing 3–9 carbon atoms, lower alkyl acetates di-lower alkyl ethers and mixtures thereof and a buffered aqueous solution while controlling the temperature of said fractional liquid extraction means so that the temperature is constant at any position throughout said means.

2. The method of claim 1 wherein the solvent system is the mutually saturated phases formed by equilibrating a mixture of isopropanol, chloroform and a buffered aqueous solution.

3. The method of claim 2 wherein the process is effected at a temperature of about 25° C. and a pH of about 8.0 to about 8.5.

4. The method of claim 3 wherein the organic phase contains, by weight, 23.25 percent isopropanol, 74.5 percent chloroform and 2.25 percent water.

5. A method of separating substantially pure coumermycin $A_1$ from a crude coumermycin complex which comprises adding the crude coumermycin complex to a liquid-liquid extraction column the temperature of which is maintained constant throughout its length, adding to an opening near the top of said column, an organic solvent phase containing a member selected from the group consisting of halogenated hydrocarbons, alkanols containing 3–9 carbon atoms, lower alkyl acetates, di-lower alkyl ethers and mixtures thereof, adding to the column at an opening near the bottom of the column, a buffered aqueous phase having a pH of from about 8.0 to about 8.8 and internally exchanging the components of the crude coumermycin complex between the organic phase and the aqueous phase with energy provided by mechanical means in the column.

6. A process as defined in claim 5 wherein the liquid-liquid extraction column employed is a reciprocating plate extraction column and the energy providing means are reciprocating plates.

7. A process as defined in claim 5 wherein the organic solvent phase added to the top of the extraction column comprises an alkanol having from 3 to 9 carbon atoms and a halogenated hydrocarbon.

8. A method as defined in claim 7 wherein the halogenated hydrocarbon is chloroform and the alkanol is isopropanol.

9. The method as defined in claim 8 wherein the process is effected at a pH of from about 8.0 to about 8.8 while maintaining the temperature of the column constant at from about 20 to about 30° throughout its length.

10. The method as defined in claim 7 wherein the organic phase contains by weight 23.25 percent of isopropanol, 74.5 percent of chloroform and 2.25 percent of water.

11. The method as defined in claim 10 wherein the buffered aqueous phase contains 1.5 percent of chloroform and 15.0 percent of isopropanol.

12. A process as in claim 7, wherein the halogenated hydrocarbon is chloroform.

References Cited

UNITED STATES PATENTS 2,566,291    8/1951    Reichstein _____ 260—210

LEWIS GOTTS, Primary Examiner

J. R. BROWN, Assistant Examiner

U.S. Cl. X.R.

195—80